(12) United States Patent
Huang et al.

(10) Patent No.: US 10,886,854 B2
(45) Date of Patent: *Jan. 5, 2021

(54) CONTROL CIRCUIT AND RELATED INTEGRATED CIRCUIT AND SWITCHING-TYPE CONVERTER

(71) Applicant: Silergy Semiconductor Technology (Hangzhou) LTD, Hangzhou (CN)

(72) Inventors: Qiukai Huang, Hangzhou (CN); Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 7 days.

This patent is subject to a terminal disclaimer.

(21) Appl. No.: 15/670,642

(22) Filed: Aug. 7, 2017

(65) Prior Publication Data

US 2017/0338744 A1 Nov. 23, 2017

Related U.S. Application Data

(63) Continuation of application No. 14/958,632, filed on Dec. 3, 2015, now Pat. No. 9,742,291.

(30) Foreign Application Priority Data

Dec. 15, 2014 (CN) .......................... 2014 1 0771984

(51) Int. Cl.
*H02M 3/335* (2006.01)
*H02M 1/00* (2006.01)

(52) U.S. Cl.
CPC ............... *H02M 3/33507* (2013.01); *H02M 2001/0006* (2013.01); *H02M 2001/0009* (2013.01)

(58) Field of Classification Search
CPC . H02M 2001/0006; H02M 2001/0009; H02M 3/335
See application file for complete search history.

(56) References Cited

U.S. PATENT DOCUMENTS 4,764,856 A * 8/1988 Rausch ................... H02J 7/022
323/285
5,019,955 A * 5/1991 Hoeksma ............ H02M 3/3385
323/289

(Continued)

FOREIGN PATENT DOCUMENTS

CN 101662210 A 3/2010

*Primary Examiner* — Thienvu V Tran
*Assistant Examiner* — Bart Iliya
(74) *Attorney, Agent, or Firm* — Michael C. Stephens, Jr.

(57) ABSTRACT

A control circuit can include: a power supply circuit having a bias capacitor coupled between a power terminal and a common node, where the power supply circuit supplies power to the control circuit via the bias capacitor; a detection circuit coupled between the common node and a current output terminal of a main power switch of a power stage circuit, to detect current flowing through the main power switch; a current feedback circuit that generates a feedback signal according to a difference value between a sense value obtained from a voltage at the power terminal during an off state of the main power switch and a present voltage at the power terminal, where the feedback signal represents an inductor current of the power stage circuit; and a control signal generator that generates a control signal according to the feedback signal to control the main power switch.

20 Claims, 6 Drawing Sheets

(56) References Cited

U.S. PATENT DOCUMENTS

| | | | |
|---|---|---|---|
| 5,896,279 A * | 4/1999 | Lin | H02M 3/33569 363/21.11 |
| 8,416,587 B2 | 4/2013 | Chen | |
| 8,638,129 B2 * | 1/2014 | Kanschat | H03K 17/06 327/108 |
| 9,130,460 B2 | 9/2015 | Sun et al. | |
| 2005/0281062 A1 | 12/2005 | Choi et al. | |
| 2008/0030181 A1 | 2/2008 | Liu et al. | |
| 2008/0112202 A1 * | 5/2008 | Hu | H02M 7/5387 363/132 |
| 2008/0278981 A1 | 11/2008 | Hachiya | |
| 2008/0303491 A1 | 12/2008 | Na | |
| 2010/0246216 A1 * | 9/2010 | Coulson | H02M 3/33523 363/21.12 |
| 2010/0321962 A1 * | 12/2010 | Lee | H02M 3/33523 363/21.12 |
| 2011/0157922 A1 * | 6/2011 | Konecny | H02M 3/33515 363/21.12 |
| 2011/0267015 A1 | 11/2011 | Lu et al. | |
| 2012/0033465 A1 | 2/2012 | Lee et al. | |
| 2012/0134182 A1 * | 5/2012 | Zhu | H02M 3/33523 363/21.17 |
| 2012/0139477 A1 * | 6/2012 | Oglesbee | H02J 7/00 320/107 |
| 2013/0294118 A1 * | 11/2013 | So | H02M 3/33507 363/21.16 |
| 2014/0003096 A1 | 1/2014 | Deng | |
| 2014/0159608 A1 * | 6/2014 | Simi | H05B 33/0887 315/205 |
| 2014/0313786 A1 | 10/2014 | Chen et al. | |
| 2014/0339995 A1 * | 11/2014 | Zanbaghi | H05B 33/0815 315/200 R |
| 2015/0003119 A1 * | 1/2015 | Li | H02M 3/33507 363/21.13 |
| 2015/0062979 A1 | 3/2015 | Xu | |
| 2015/0244276 A1 * | 8/2015 | Li | H02M 3/33507 363/21.17 |
| 2015/0340957 A1 | 11/2015 | Fang et al. | |

* cited by examiner

CONTROL CIRCUIT AND RELATED INTEGRATED CIRCUIT AND SWITCHING-TYPE CONVERTER

RELATED APPLICATIONS

This application is a continuation of the following application, U.S. patent application Ser. No. 14/958,632, filed on Dec. 3, 2015, and which is hereby incorporated by reference as if it is set forth in full in this specification, and which also claims the benefit of Chinese Patent Application No. 201410771984.3, filed on Dec. 15, 2014, which is incorporated herein by reference in its entirety.

FIELD OF THE INVENTION

The present disclosure generally relates to the field of power electronics, and more particularly to control circuitry and associated integrated circuit and switch-type converters.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a control circuit can include: (i) a power supply circuit having a bias capacitor coupled between a power terminal and a common node, where the power supply circuit is configured to supply power to the control circuit via the bias capacitor; (ii) a detection circuit coupled between the common node and a current output terminal of a main power switch of a power stage circuit, where the detection circuit is configured to detect current flowing through the main power switch; (iii) a current feedback circuit configured to generate a feedback signal according to a difference value between a sense value obtained from a voltage at the power terminal during an off state of the main power switch and a present voltage at the power terminal, where the feedback signal represents an inductor current of the power stage circuit; and (iv) a control signal generator configured to generate a control signal according to the feedback signal to control the main power switch.

In one embodiment, an integrated circuit can include: (i) a power supply pin; (ii) a current feedback circuit coupled with the power supply pin, and being configured to generate a feedback signal according to a sense value obtained at the power supply pin during an off state of a main power switch of a power stage circuit of a switch-type converter and a present voltage at the power supply pin, where the feedback signal represents an inductor current of the power stage circuit; and (iii) a control signal generator configured to generate a control signal according to the feedback signal to control the main power switch.

DETAILED DESCRIPTION

Figure 1A:
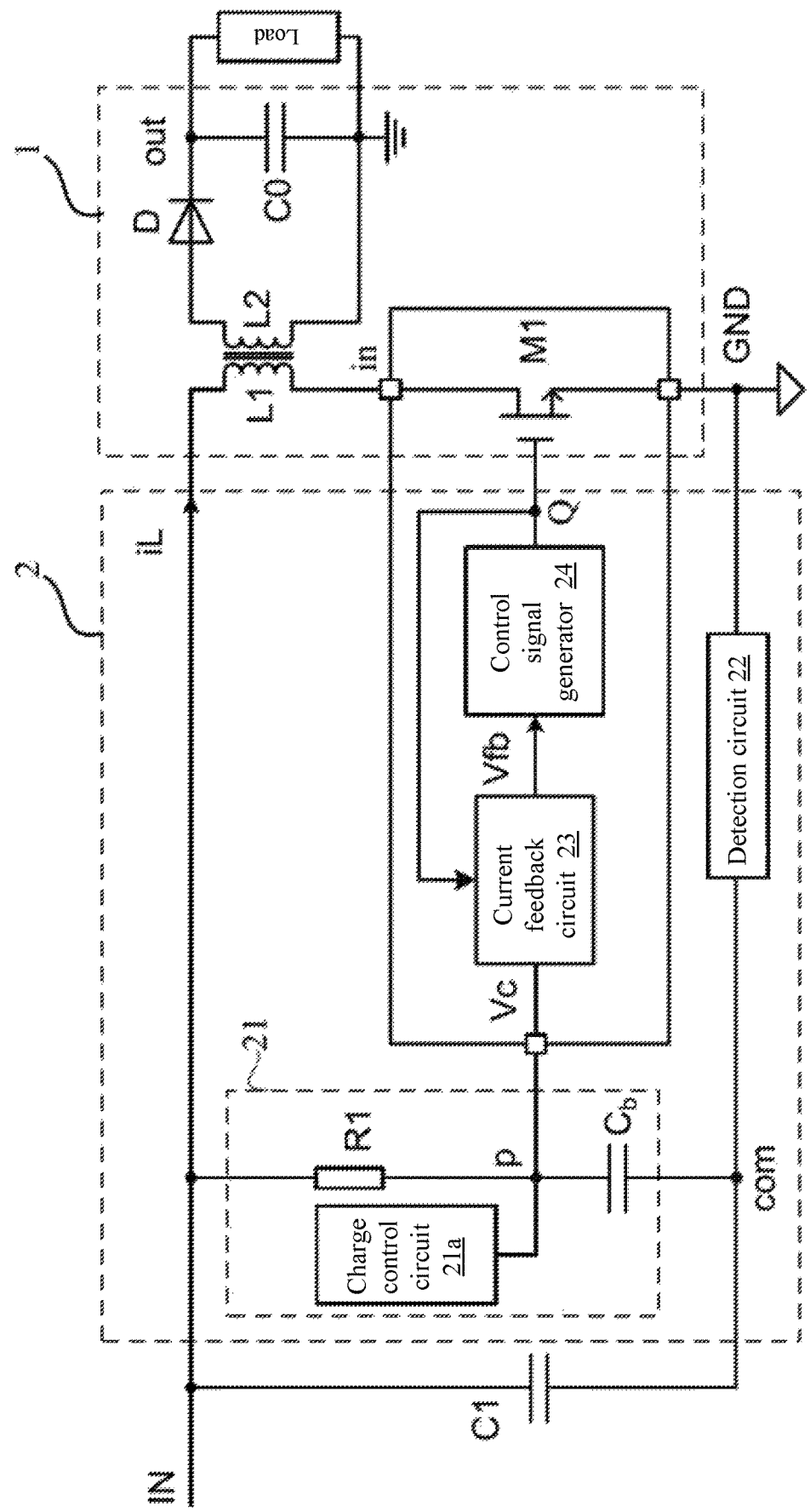
FIG. 1A is a schematic block diagram of an example switch-type converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switch-type converter may generally include a control circuit and a power stage circuit. The power stage circuit is used to obtain a substantially stable output by controlling an inductor current via a main power switch. The control circuit is generally used to control the main power switch in the power stage circuit according to a feedback signal that is indicative of the inductor current, so as to control the power stage circuit to output a substantially constant current. Typically, a resistor may be included between the main power switch and ground, in order to detect the inductor current for obtaining the feedback signal. Therefore, at least four pins, such as a bias power supply pin, a ground pin, a detection pin, and an input pin can be required when the control circuit is integrated as an integrated circuit. However, it may be difficult to package a chip with too many pins, which may also increase manufacturing costs.

In one embodiment, a control circuit can include: (i) a power supply circuit having a bias capacitor coupled between a power terminal and a common node, where the power supply circuit is configured to supply power to the control circuit via the bias capacitor; (ii) a detection circuit coupled between the common node and a current output terminal of a main power switch of a power stage circuit, where the detection circuit is configured to detect current flowing through the main power switch; (iii) a current feedback circuit configured to generate a feedback signal according to a difference value between a sense value obtained from a voltage at the power terminal during an off state of the main power switch and a present voltage at the power terminal, where the feedback signal represents an inductor current of the power stage circuit; and (iv) a control signal generator configured to generate a control signal according to the feedback signal to control the main power switch.

In one embodiment, an integrated circuit can include: (i) a power supply pin; (ii) a current feedback circuit coupled with the power supply pin, and being configured to generate a feedback signal according to a sense value obtained at the power supply pin during an off state of a main power switch of a power stage circuit of a switch-type converter and a present voltage at the power supply pin, where the feedback signal represents an inductor current of the power stage circuit; and (iii) a control signal generator configured to generate a control signal according to the feedback signal to control the main power switch.

Referring now to FIG. 1A, shown is a schematic block diagram of an example switch-type converter, in accordance with embodiments of the present invention. In this example, the switch-type converter can include power stage circuit 1 and control circuit 2. The switch-type converter may be used in a wide variety of applications, such as a light-emitting diode (LED) driver. In this case, power stage circuit 1 can be configured in a flyback topology, which can include main power switch M1, primary winding L1, secondary winding L2, rectifier diode D, and capacitor C0. In other examples, power stage circuit 1 can be configured in any other suitable topology (buck, boost, etc.).

For example, one terminal of primary winding L1 can connect to power input terminal IN of power stage circuit 1. Main power switch M1 can connect between the other terminal of primary winding L1 and ground GND of the control circuit. Main power switch M1 can be any type of controllable semiconductor switch (e.g., metal-oxide-semiconductor transistor [MOSFET], bipolar junction transistor [BJT], etc.). Secondary winding L2 is coupled with primary winding L1 to form a transformer. Rectifier diode D can connect between one terminal of secondary winding L2 and output terminal "out." The other terminal of secondary winding L2 can connect the ground of the secondary-side. Capacitor C0 can connect between the output terminal and the ground of the secondary-side. Power stage circuit 1 can also include capacitor C1 with one terminal connected to power input terminal IN, and the other terminal connected to a common node "com" for filtering the supply voltage. The common node can be configured as the ground of the primary-side.

Control circuit 2 can include power supply circuit 21, detection circuit 22, current feedback circuit 23, and control signal generator 24. Power supply circuit 21 can be used to charge bias capacitor Cb therein, so as to obtain a voltage at a power terminal "p" for supplying power to remaining portions of control circuit 2 (e.g., for providing a bias voltage to control circuit 2). Bias capacitor Cb can connect between power terminal "p" and common node "com" as a part of power supply circuit 21. Power supply circuit 21 can include bias capacitor Cb and charge control circuit 21a. Charge control circuit 21a can be used to control a voltage of the power stage circuit to charge bias capacitor Cb, so as to generate voltage Vc at the power terminal to ensure operation of control circuit 2. Power supply circuit 21 can also include resistor R1 connected between power input terminal IN and power terminal "p" of power stage circuit 1.

Bias capacitor Cb can be charged via resistor R1 during a start-up period so as to start or power-up control circuit 2. Power supply circuit 21 can generate voltage Vc at the power terminal. For example, when main power switch M1 is turned off, voltage Vc can be a predetermined voltage Vcc, and when main power switch M1 is turned on, voltage Vc may decrease as inductor current iL increases. Charge control circuit 21a may be any suitable circuit that provides a power supply to the control circuit by charging and discharging the bias capacitor, such as a charge control circuit based on the voltage of the primary winding or an auxiliary winding. Charge control circuit 21a can be integrated in an integrated circuit, or can be any other suitable circuit structure or arrangement. In one example, charge control circuit 21a, current feedback circuit 23, and control signal generator 24 can be integrated in one integrated circuit.

Figure 1B:
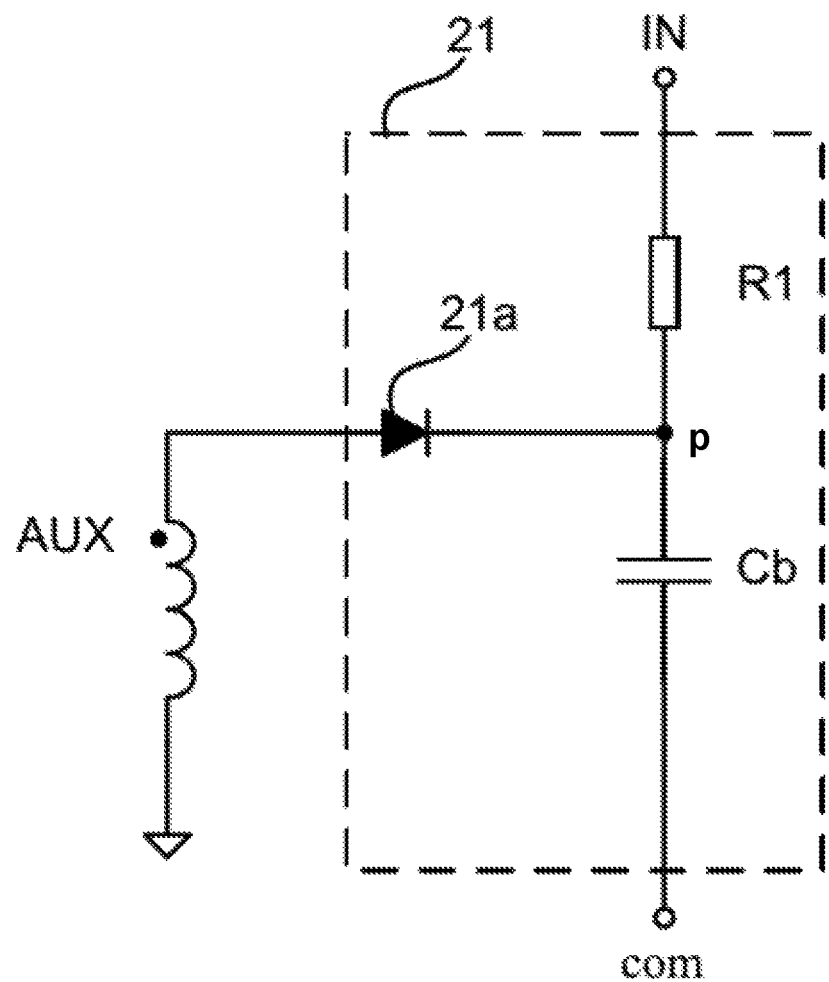
FIG. 1B is a schematic block diagram of an example power supply adapted, in accordance with embodiments of the present invention.

Referring now to FIG. 1B, shown is a schematic block diagram of an example power supply adapted, in accordance with embodiments of the present invention. In this particular example, the power supply circuit can be based on auxiliary winding AUX. There may be no current flowing through auxiliary winding AUX when main power switch M1 is turned on, while an induction current that changes along with the current flowing through secondary winding L2 can be generated when main power switch M1 is turned off. In this example, charge control circuit 21a can include a diode with its anode connected to auxiliary winding AUX and its cathode connected to the power terminal "p." When main power switch M1 is turned off, bias capacitor Cb can be charged by the induction current via the diode. When main power switch M1 is turned on, the diode can block the current flowing from bias capacitor Cb to auxiliary winding AUX. In this way, the control circuit can be powered by charging and discharging bias capacitor Cb.

Figure 1C:
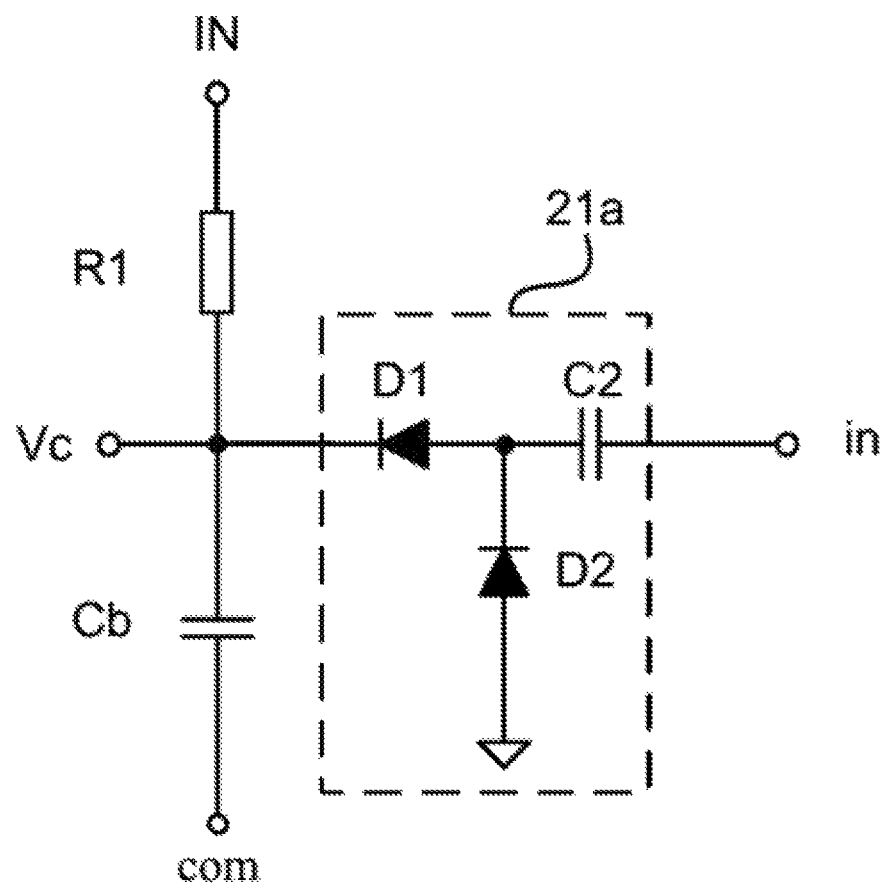
FIG. 1C is a schematic block diagram of another example power supply, in accordance with embodiments of the present invention.

Referring now to FIG. 1C, shown is a schematic block diagram of another example power supply, in accordance with embodiments of the present invention. In this example, the power supply circuit can be integrated in an integrated chip because no auxiliary winding AUX may be needed. Charge control circuit 21a can connect to bias capacitor Cb and a power input terminal IN for receiving the power to charge bias capacitor Cb. For example, power input terminal IN can connect to one terminal of the main power switch, such as a common node of the main power switch and primary winding L1.

Charge control circuit 21a can include an energy storage circuit, a discharge branch, and a charge branch. For example, the energy storage circuit may have one terminal connected to the power input terminal IN and the other terminal connected to the discharge branch and to the charge branch. The discharge branch can include discharge diode D2, and the charge branch can include charge diode D1. The energy storage circuit can include energy storage capacitor C2 with one terminal connected to one terminal of main power switch M1 (e.g., the drain of an N-type MOSFET), and the other terminal connected to the cathode of discharge diode D2 and to the anode of charge diode D1.

The anode of discharge diode D2 can connect to ground to form a discharge loop for energy storage capacitor C2. The cathode of charge diode D1 can connect to power terminal "p" so as to make sure that the power can only be transmitted to bias capacitor Cb from energy storage capacitor C2 in one direction. Therefore, when main power switch M1 is turned off, energy storage capacitor C2 can charge bias capacitor Cb via charge diode D1. When main power switch M1 is turned on, charge diode D1 can block the current flowing from bias capacitor Cb to charge control circuit 21a, energy storage capacitor C2 can be discharged via discharge diode D2, and bias capacitor Cb may be utilized to supply voltage to control circuit 2. Therefore, the control circuit can be powered by charging and discharging bias capacitor Cb.

Referring again to FIG. 1A, detection circuit 22 can connect between the other terminal (e.g., source) of main power switch M1 and the common node "com." In this particular example, the common node can be configured as the ground at the primary side of the power stage circuit. Also, the current output terminal of a switch may be a terminal that has a relatively low voltage and a current flowing out therefrom, such as the source of an N-type MOSFET. For example, detection circuit 22 can be implemented by a resistor Rv. Detection circuit 22 can be configured as a current passage between the current output terminal of main power switch M1 and the common node "com," in order to detect the current flowing through main power switch M1 and/or detection circuit 22. When main power switch M1 is turned on, inductor current iL can flow through main power switch M1 and detection circuit 22 to the common node "com."

Current feedback circuit 23 can connect to power terminal "p" for generating feedback signal Vfb according to a difference value between sense value Vs obtained from voltage Vc when main power switch M1 is turned off, and present voltage Vc. Also, feedback signal Vfb can be representative of inductor current iL of power stage circuit 1. Further, control signal generator 24 can generate a control signal for controlling main power switch M1 according to feedback signal Vfb. In this particular example, power stage circuit 1 is of a flyback topology, so control signal generator 24 may control main power switch M1 to be turned off when the peak value of the inductor current reaches a predetermined value, so as to achieve constant current control. Those skilled in the art will recognize that the power stage circuit can be any suitable converter topology, and can also be controlled by other approaches based on the inductor current.

When main power switch M1 is turned off, voltage Vc can be a predetermined voltage Vcc, so supply voltage Vcc can be obtained during this period. After main power switch M1 is turned on, inductor current iL may flow through main power switch M1 and detection circuit 22. The potential at the common node "com" may be lower than the ground potential because of the voltage drop of detection circuit 22 due to inductor current iL. Accordingly, voltage Vc can be lower, and voltage Vc may be related to inductor current iL. When detection circuit 22 is implemented by resistor Rv, the voltage drop of detection circuit 22 is iL*Rv. In such a case, the potential at the common node "com" can be iL*Rv lower than before. Also, because the voltage across bias capacitor Cb may remain substantially constant, voltage Vc can substantially equal Vcc−iL*Rv when main power switch M1 is turned on. Thus, a feedback signal Vfb that changes along with the inductor current can be obtained according to the difference value between sense voltage Vs (e.g., Vcc) and present voltage Vc (e.g., Vcc−iL*Rv).

In this way, the variation of the inductor current can be obtained by detecting the voltage at the power terminal, so as to simplify the overall circuit structure. As shown, current feedback circuit 23, control signal generator 24, and main power switch M1 can be integrated in one chip with an input pin, a ground pin, and a power supply pin, so no additional current sense pin is required. Therefore, the package of the integrated circuit can be simplified with a reduced size. Alternatively, current feedback circuit 23 and control signal generator 24 can be integrated in one chip excluding main power switch M1, which may also have fewer pins without the current sense pin.

Figure 2:
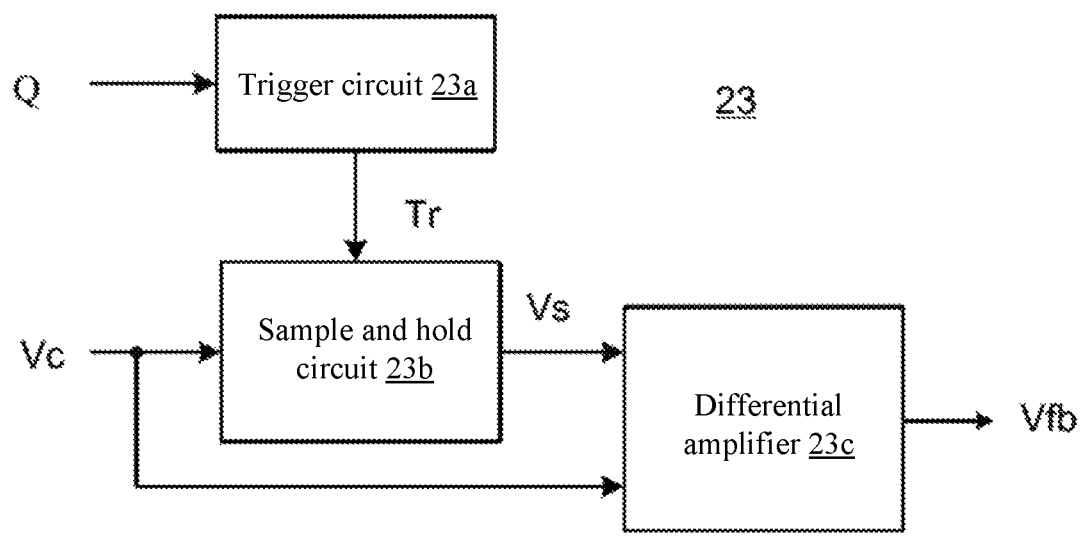
FIG. 2 is a schematic block diagram of an example integrated circuit, in accordance with embodiments of the present invention.

Referring now to FIG. 2, shown is a schematic block diagram of an example integrated circuit, in accordance with embodiments of the present invention. In this particular example, current feedback circuit 23 can include trigger circuit 23a, sample and hold circuit 23b, and differential amplifier 23c. Trigger signal 23a can receive control signal Q, and may generate trigger signal Tr, including activating trigger signal Tr when control signal Q represents the off state in each switching cycle. For example, trigger signal Tr can be a pulse signal, such as a high-going pulse, and trigger circuit 23a can be implemented as a single-pulse trigger circuit. Sample and hold circuit 23b can receive trigger signal Tr and voltage Vc, and may generate sense value Vs by sampling voltage Vc according to trigger signal Tr. Differential amplifier 23c can receive sense value Vs and voltage Vc, and may generate feedback signal Vfb according to the difference value between sense value Vs and voltage Vc.

Figure 3:
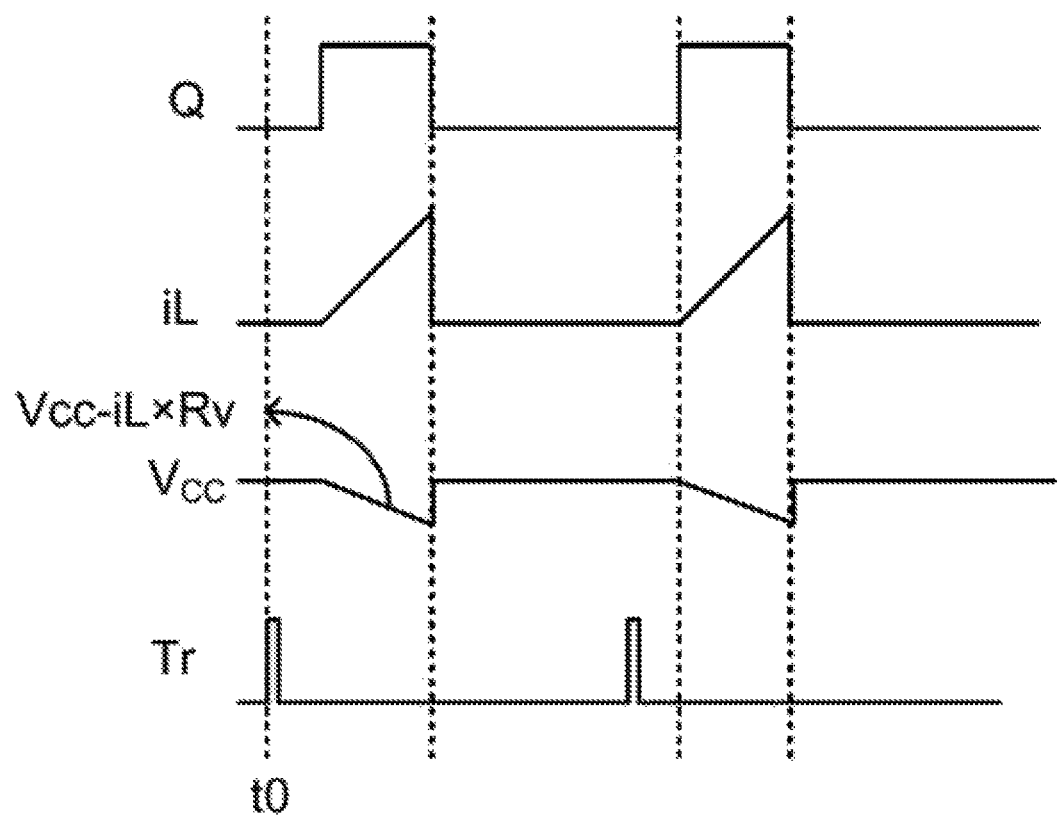
FIG. 3 is a waveform diagram of example operation of a switch-type converter, in accordance with embodiments of the present invention.

Referring now to FIG. 3, shown is a waveform diagram of example operation of a switch-type converter, in accordance with embodiments of the present invention. In this particular example, trigger circuit 23a can activate trigger signal Tr after a delay time has elapsed after control signal Q transitions from high to low to represent an off state from an on state transition (e.g., at time t0), so as to start sampling after control signal Q turns to represent the off state. Because supply voltage Vcc may be a substantially constant value, any sense value obtained in the off state of the main power switch may represent supply voltage Vcc.

Trigger circuit 23a can be a single-pulse trigger circuit that generates a pulse signal by a delay time after being triggered at the falling edge of the input signal (e.g., control signal Q). Sample and hold circuit 23b can sample voltage Vc at time t0 in order to obtain sense value Vs (e.g., Vcc). When control signal Q turns to represent the on state (e.g., goes high), voltage Vc may decrease when the inductor current increases. Because sense value Vs can remain substantially constant, the variation of inductor current iL can be represented by the difference value between sense value Vs and voltage Vc obtained in the on state of main power switch M1 via differential amplifier 23c.

Figure 4:
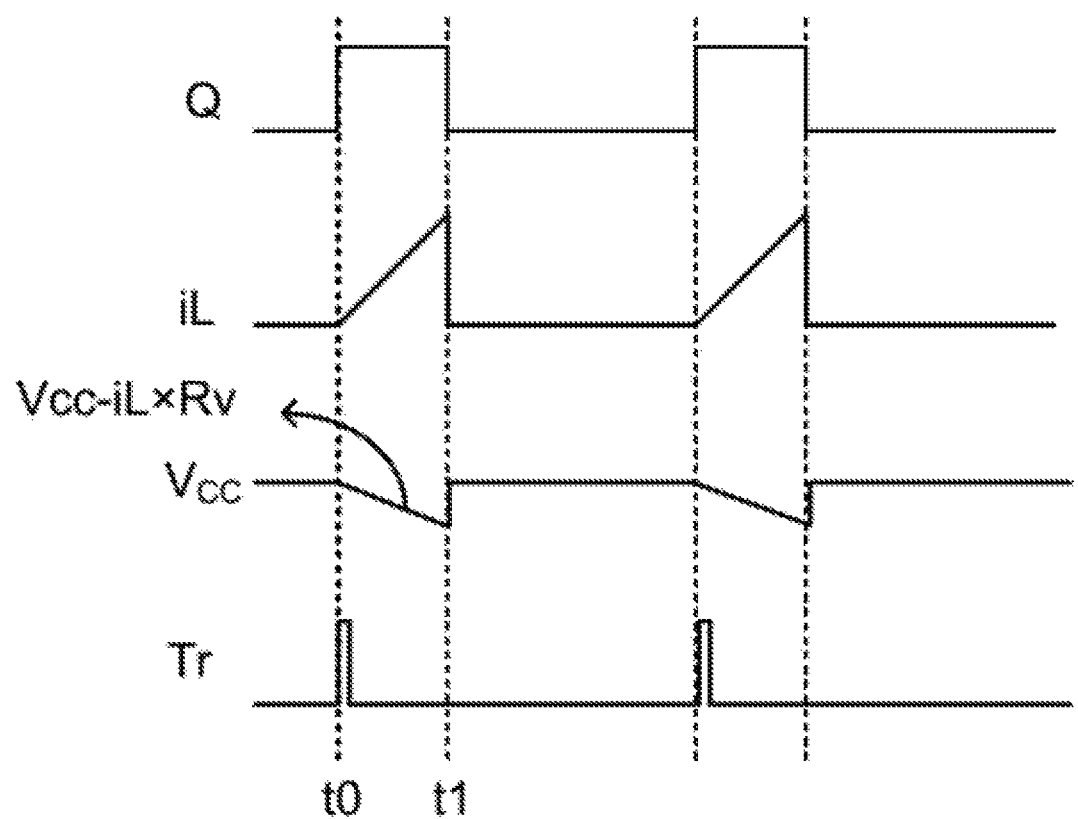
FIG. 4 is a waveform diagram of another example operation of a switch-type converter, in accordance with embodiments of the present invention.

Referring now to FIG. 4, shown is a waveform diagram of another example operation of a switch-type converter, in accordance with embodiments of the present invention. In this particular example, trigger circuit 23a can activate trigger signal Tr when control signal Q turns to represent the on state from representing the off state (e.g., the rising edge of control signal Q at time t0). Trigger circuit 23a can be a single-pulse trigger circuit that generates a pulse signal at the rising edge of the input signal (e.g., control signal Q). Sample and hold circuit 23b can sample voltage Vc at time t0 to obtain sense value Vs (e.g., Vcc). When control signal Q turns to represent the on state (e.g., goes high), voltage Vc can decrease when the inductor current increases. Because sense value Vs can remain substantially constant, the variation of inductor current iL can be represented by the difference value between sense value Vs and voltage Vc obtained in the on state (e.g., from time t0 to time t1) of main power switch M1 via differential amplifier 23c. When main power switch M1 is turned off, current iL flowing through main power switch M1 can be 0, so sense value Vs can substantially equal supply voltage Vcc, and feedback signal Vfb can also be 0.

In certain embodiments, the detection circuit (e.g., 22) may be configured between the current output terminal (e.g., "out") of the main power switch (e.g., M1) and the bias capacitor (e.g., Cb), so the current flowing through the main power switch may also flow through the detection circuit during the on state of the main power switch in order to change the voltage at the power terminal (e.g., "p"). As a result, the voltage at the power terminal can decrease when the inductor current increases during the on state of the main power switch, but can remain substantially constant during the off state of the main power switch. Thus, the inductor current can be detected via the voltage at the power terminal, and the power supply pin can be also used as a current detection pin, in order to simplify the overall circuit structure. In this way, the package of the integrated circuit can be simplified when the control circuit is integrated into a chip, in order to reduce the overall chip size.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit configured to control a main power switch of a power stage circuit, the control circuit comprising:
   a) a detection circuit coupled between ground and a first terminal of a bias capacitor of a power supply circuit, wherein a second terminal of said bias capacitor is configured to provide a supply voltage to power said control circuit, and said first terminal of said bias capacitor is not connected to ground;
   b) a current feedback circuit configured to receive said supply voltage, and to generate a feedback signal that represents an inductor current of said power stage circuit according to a difference between said supply voltage when said main power switch is on and when said main power switch is off, wherein said supply voltage is maintained when said main power switch is off, and said supply voltage is decreased in accordance with said inductor current and said detection circuit when said main power switch is on; and
   c) a control signal generator configured to generate a control signal according to said feedback signal to control said main power switch, wherein said main power switch is controlled to be off by said control signal when a peak value of said feedback signal reaches a predetermined threshold.

2. The control circuit of claim 1, wherein said detection circuit comprises a resistor.

3. The control circuit of claim 1, wherein said current feedback circuit comprises:
   a) a trigger circuit configured to activate a trigger signal when said control signal represents an off state of said main power switch in each switching cycle;
   b) a sample and hold circuit configured to sample said voltage at said power terminal according to said trigger signal, and to generate a sense value; and
   c) a differential amplifier configured to generate said feedback signal according to said difference value between said sense value and said voltage at said power terminal.

4. The control circuit of claim 3, wherein said trigger circuit is configured to activate said trigger signal when said control signal transitions from indicating an off state of said main power switch to indicating an on state of said main power switch.

5. The control circuit of claim 3, wherein said trigger circuit is configured to activate said trigger signal after a delay time has elapsed after said control signal transitions from indicating an on state of said main power switch to indicating an off state of said main power switch.

6. The control circuit of claim 3, wherein said trigger signal is activated as a single pulse signal.

7. A switch-type converter, comprising:
   a) said power stage circuit having said main power switch; and
   b) said control circuit of claim 1.

8. The control circuit of claim 1, further comprising:
   a) a sample and hold circuit configured to receive said supply voltage; and
   b) a trigger circuit configured to receive said control signal.

9. The control circuit of claim 1, wherein said supply voltage is received by said current feedback circuit at a sample and hold circuit.

10. The control circuit of claim 9, wherein said current feedback circuit comprises a trigger circuit that receives said control signal.

11. The control circuit of claim 1, wherein said supply voltage is constant when said main power switch is off, and said supply voltage is variable with said inductor current when said main power switch is on.

12. An integrated circuit, comprising:
   a) a power transistor having a first power terminal configured as an input pin, and a second power terminal configured as a ground pin, wherein said ground pin is directly connected to ground and said input pin is directly connected to an inductor of a power stage circuit;
   b) a power supply pin coupled to receive a supply voltage from a bias capacitor that is coupled to a detection circuit that is coupled to ground, wherein said bias capacitor is not connected to ground;
   c) a current feedback circuit coupled to said power supply pin, and being configured to receive said supply voltage, and to generate a feedback signal that represents an inductor current of said power stage circuit according to a difference between said supply voltage when in a first state and when in a second state, wherein said supply voltage is constant when in said second state, and said supply voltage is variable with said inductor current when in said first state through said detection circuit; and
   d) a control signal generator configured to generate a control signal according to said feedback signal to control a main power switch of said power stage circuit, wherein said main power switch is controlled to be off by said control signal when a peak value of said feedback signal reaches a predetermined threshold.

13. The integrated circuit of claim 12, further comprising:
   a) a sample and hold circuit configured to receive said supply voltage; and
   b) a trigger circuit configured to receive said control signal.

14. The integrated circuit of claim 13, wherein said trigger circuit that receives said control signal generates a trigger signal that is activated as a single pulse signal.

15. The integrated circuit of claim 12, wherein said current feedback circuit comprises:

a) a trigger circuit configured to activate a trigger signal when said control signal represents an off state of said main power switch in each switching cycle;
b) a sample and hold circuit configured to sample said voltage at said power supply pin according to said trigger signal, and to generate a sense value; and
c) a differential amplifier configured to generate said feedback signal according to said difference value between said sense value and said voltage at said power supply pin.

16. The integrated circuit of claim 15, wherein said trigger circuit is configured to activate said trigger signal when said control signal transitions from indicating an off state of said main power switch to indicating an on state of said main power switch.

17. The integrated circuit of claim 15, wherein said trigger circuit is configured to activate said trigger signal after a delay time has elapsed after said control signal transitions from indicating an on state of said main power switch to indicating an off state of said main power switch.

18. The integrated circuit of claim 15, wherein said trigger signal is activated as a single pulse signal.

19. The integrated circuit of claim 12, wherein said main power switch is on in said first state, and said main power switch is off in said second state.

20. The integrated circuit of claim 12, wherein said bias capacitor is connected between said power supply pin and a common node that is separate from ground.

\* \* \* \* \*